UNITED STATES PATENT OFFICE.

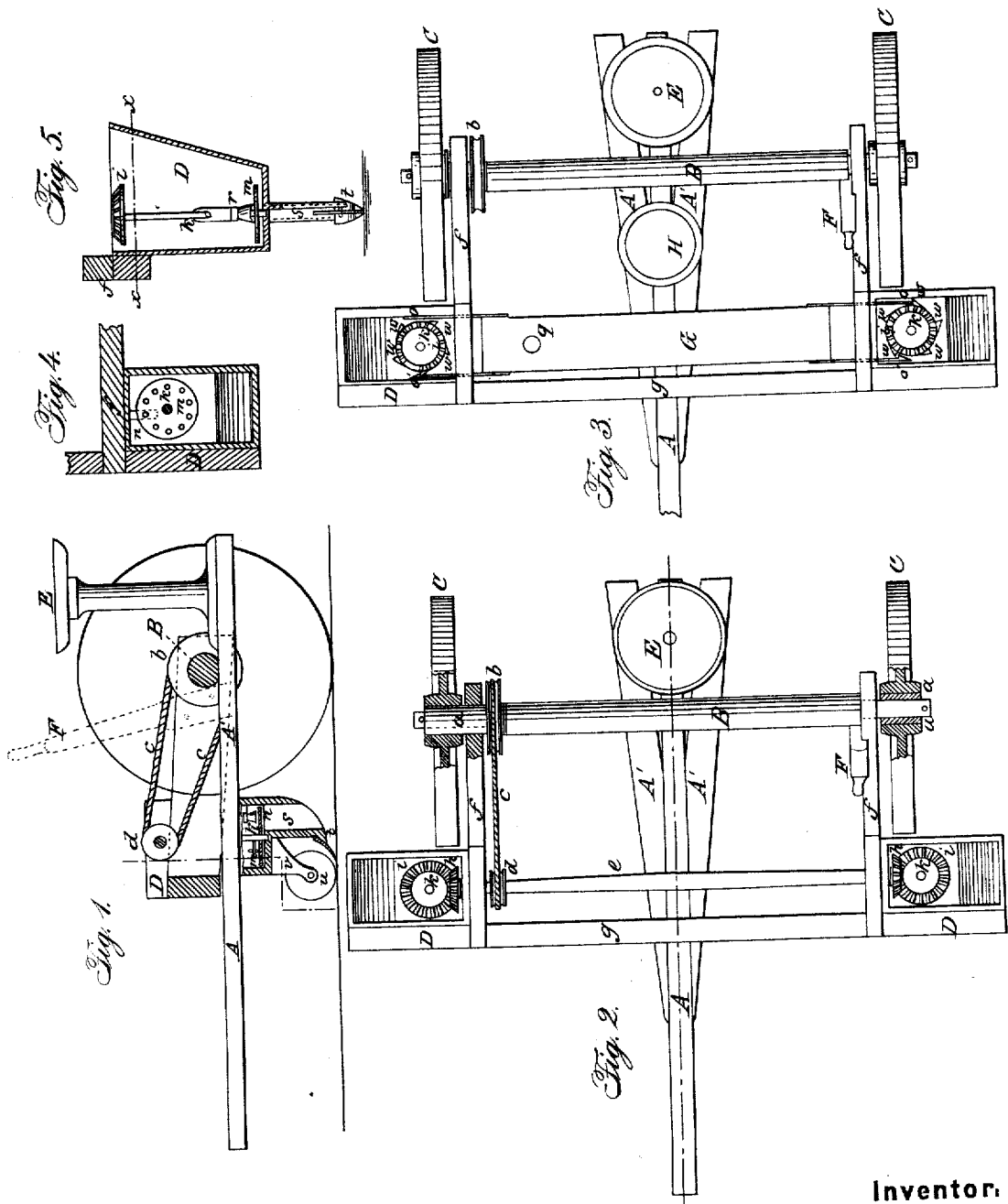

W. H. COX, OF VIRDEN, ILLINOIS.

IMPROVEMENT IN CORN-PLANTERS.

Specification forming part of Letters Patent No. 58,988, dated October 23, 1866.

*To all whom it may concern:*

Be it known that I, W. H. Cox, of Virden, in the county of Macoupin and State of Illinois, have invented a new and useful Improvement in Corn-Planters; and I do hereby declare that the following is a full, clear, and exact description thereof, which will enable others skilled in the art to make and use the same, reference being had to the accompanying drawings, forming a part of this specification, in which—

Figure 1 is a sectional side view, with parts of the hopper removed, showing the internal arrangement of the seeding apparatus. Fig. 2 is a plan or top view of my machine for planting corn in drills. Fig. 3 is the same arranged for planting in hills. Fig. 4 is a horizontal section of a seed-hopper detached, taken in the line $x\,x$, Fig. 5. Fig. 5 is a vertical section of the same detached.

Similar letters of reference indicate like parts.

This invention relates to seed-planting machines, and consists in the construction of novel and improved mechanism for dropping single kernels of Indian corn in regular succession in drills, operated by gearing connected with the driving-wheels as the machine moves in the field, and also an arrangement for shifting the gearing and arranging the dropping apparatus to work by hand and plant the corn in hills.

The principal object of this invention is to produce a reliable machine for dropping single kernels of corn regularly in succession.

The common defect of corn-planting machines operated by a reciprocating motion of slides in a hopper is the uncertainty and irregularity of dropping the kernels of corn, either as regards a certain number in hills or single kernels successively in drills, which defect is obviated in my invention by employing revolving perforated plates, which are so arranged as to feed and drop the exact number of kernels desired in regular succession, either in hills or drills.

The draft-pole A runs back under the axle B, which is rigidly fastened upon it, the rear part of the draft-pole being fortified by side pieces A' A'.

The driving-wheels C C have metal tubes or thimbles $a\,a$ inserted in the hub, which are fitted to run on the ends of the axle B, one of these thimbles extending inward upon the axle far enough to carry a driving-pulley, $b$, which should be made graduated to change and regulate the speed of the seed-dropping apparatus, which receives its motion by a band, $c$, running from the pulley $b$ to a smaller pulley, $d$, on the transverse shaft $e$, having bearings in two side pieces, $f\,f$, that are hung at their rear ends on the axle B, and are framed at their front ends into a cross-beam, $g$, on the ends of which are suspended the hoppers D D.

On the ends of the shaft $e$, worked by the pulleys $b\,d$, are placed small vertical bevel-wheels $h\,h$, which engage in horizontal bevel-wheels $i\,i$, placed within the hoppers D D on the shafts $k\,k$, which run down and are stepped in the bottom of the hoppers. On the lower ends of the shafts $k\,k$, placed close to the bottom of the hoppers, are affixed revolving plates $m\,m$, which are perforated at regular distances near their peripheries with holes for receiving one or more kernels of corn, as may be desired, for planting single grains successively in drills or a number of grains at a time in hills, as shown at Fig. 4. In the bottom of the hoppers are openings $n$, Fig. 4, underneath the revolving plates $m$, through which the grains of corn fall, as the plates revolve, into spouts $s\,s$, that run down from the bottom of the hoppers nearly to the ground, on the ends of which spouts, on the front sides, are placed small shovel-plows $t\,t$, for opening furrows to receive the corn, and behind which may be attached suitable grain-coverers. In front of the plows $t\,t$ small guide and supporting wheels $u\,u$ are hung upon projections or lugs $v\,v$, that are fastened on the under sides of the hoppers D D. In the rear of the axle B is mounted a driver's seat, E.

To prevent the grains of corn from being crushed, and allow only a certain number to be fed and drop through the holes in the revolving plates $m\,m$ at a time, small yielding sweeps or brushes $v\,v$, Figs. 1 and 5, are placed above the plates, so that when they revolve under the brushes only the grains actually in the holes in the plates can pass and drop into the spouts $s\,s$.

Now, by means of this dropping apparatus, which receives its motion from one of the driving-wheels C through the pulleys $b\,d$, the corn placed in the hoppers D D may be dropped in single grains at any distance apart in drills, according to the speed given by a graduated pulley, $b$, and the number of holes made in the plates $m\ m$, thus planting two drills of corn at a time with perfect regularity.

For the purpose of elevating the frame of the hoppers to clear obstructions in the way of the plows and turn around at the ends of the rows, an upright lever, F, is attached to one of the side pieces, $f$, so that the driver can work it and lift the frame at pleasure.

In order to adapt my machine for planting corn in hills the pulley-gearing and the shaft $e$, with the bevel-wheels $h\ h$, are unshipped, and a slide-piece, G, is placed across the front of the hopper-frame, on both ends of which are set push and pull pawls $o\ o'$, which extend into the hopper and work on both sides of the bevel-wheels $i\ i$. The pawls engage in notches $w\ w$ on the peripheries of the bevel-wheels, as shown by Fig. 3.

On the upper side of the cross-slide G is fastened a handle, $q$, by which the slide is moved back and forth by an attendant who rides on the seat H, which is movable and placed on the draft-pole A, in front of the axle B, when required. The revolving plates $m$ are also changed and thicker plates, carrying a number of grains of corn in the holes, are substituted for the thin plates used in dropping single kernels in drills.

Having described my invention, what I claim as new, and desire to secure by Letters Patent, is—

1. The perforated horizontal revolving plates $m\ m$ in the hoppers D D, for feeding and dropping the grains of corn evenly, in combination therewith and with the bevel-gear wheels $h\ i$, and the pulleys $b\ d$, connected with and deriving their motion from one of the driving-wheels C, constructed and arranged substantially as and for the purposes herein described.

2. The thimble $a$ within the hub of the driving-wheel C, for carrying the pulley $b$, in combination therewith and with the stationary axle B, constructed and operating substantially as and for the purposes herein specified.

3. The arrangement of the side pieces, $f\ f$, hung upon the axle B, for supporting the hoppers D D, and raising and lowering at pleasure with the lever F, substantially as herein described.

4. The slide piece G, with the push and pull pawls $o\ o'$, for working the seed-dropping apparatus by hand when adjusted for planting corn in hills, in combination with the revolving perforated plates $m\ m$, to which they impart an intermittent motion, arranged and operating substantially as herein described.

The above specification of my invention signed by me this 27th day of August, 1866.

W. H. COX.

Witnesses:
 WILLIS SIMS,
 GORDON EVANS.